(12) United States Patent
Todorovic

(10) Patent No.: US 11,215,140 B2
(45) Date of Patent: Jan. 4, 2022

(54) EXHAUST NOZZLE OF A GAS TURBINE ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO. KG, Blankenfelde-Mahlow (DE)

( * ) Notice: Subject to any disclaimer, the term of this patent is extended or adjusted under 35 U.S.C. 154(b) by 13 days.

(21) Appl. No.: 16/719,001

(22) Filed: Dec. 18, 2019

(65) Prior Publication Data

US 2021/0190002 A1 Jun. 24, 2021

(51) Int. Cl.
*F02K 1/64* (2006.01)
*F02K 1/54* (2006.01)
*F02K 1/08* (2006.01)
*F02K 1/76* (2006.01)

(52) U.S. Cl.
CPC ............... *F02K 1/54* (2013.01); *F02K 1/08* (2013.01); *F02K 1/763* (2013.01)

(58) Field of Classification Search
CPC ..... F02K 1/06; F02K 1/09; F02K 1/54; F02K 1/56; F02K 1/62; F02K 1/625; F02K 1/64; F02K 1/70; F02K 1/72; F02K 1/763; F02K 1/08
See application file for complete search history.

(56) References Cited

U.S. PATENT DOCUMENTS

| 3,829,020 A * | 8/1974 | Stearns ................. F02K 1/827 239/265.13 |
| 6,622,474 B1 * | 9/2003 | Stemberger ............. F02K 1/72 60/226.2 |
| 2003/0070416 A1 * | 4/2003 | Johnson ................ F02K 1/76 60/226.2 |
| 2005/0103933 A1 * | 5/2005 | Lair ........................ F02K 1/09 244/110 B |
| 2009/0199536 A1 * | 8/2009 | Bulin ....................... F02K 1/72 60/226.2 |

(Continued)

FOREIGN PATENT DOCUMENTS

DE 102017130563 A1 6/2019

*Primary Examiner* — Gerald L Sung
(74) *Attorney, Agent, or Firm* — Shuttleworth & Ingersoll, PLC; Timothy Klima (57) ABSTRACT

An exhaust nozzle of a gas turbine engine which includes a nozzle wall, the nozzle wall including an upstream, fixed structure and a downstream, translatable structure that is translatable relative to the fixed structure, a flow channel which is limited radially outwards by the nozzle wall, a centerbody arranged in the flow channel, at least one strut connecting the centerbody to the nozzle wall, a thrust reverser unit that comprises blocking doors, a first actuation system for deployment of the blocking doors into a deployed position for thrust reversal, and a second actuation system for translating the translatable structure between a stowed, upstream position and a fully deployed, downstream position. It is provided that the at least one strut is connected to the fixed structure, that the blocking doors are connected to the translatable structure, and that the first actuation system and the second actuation system are independent actuation systems.

20 Claims, 11 Drawing Sheets

(56) References Cited

U.S. PATENT DOCUMENTS

| | | | | |
|---|---|---|---|---|
| 2009/0288386 A1* | 11/2009 | Marshall | .................. | F02K 1/72 60/204 |
| 2013/0078081 A1* | 3/2013 | Chakkera | .................. | F02K 1/70 415/150 |
| 2013/0186219 A1* | 7/2013 | Jones | ..................... | F02K 1/09 74/89.39 |
| 2013/0213006 A1* | 8/2013 | Jones | ..................... | F02K 1/06 60/204 |
| 2014/0027537 A1* | 1/2014 | Binks | ..................... | F02K 1/09 239/265.35 |
| 2015/0122904 A1* | 5/2015 | Burghdoff | ................ | F02K 1/72 239/1 |
| 2016/0123178 A1* | 5/2016 | Tersmette | ................ | F02K 1/08 239/11 |

\* cited by examiner

EXHAUST NOZZLE OF A GAS TURBINE ENGINE

The present disclosure relates to an exhaust nozzle of a gas turbine engine.

It is known to provide for a variable area exhaust nozzle that comprises an outer nozzle wall and a centerbody that is displaceable in the axial direction relative to the outer nozzle wall. Document DE 10 2017 130 563 A1 describes an exhaust nozzle of a turbofan engine that comprises a centerbody which is connected by means of struts to an outer nozzle wall. To move the centerbody in the axial direction, the struts are axially displaceable relative to the nozzle wall. DE 10 2017 130 563 A1 further discloses the integration of a thrust reverser unit that comprises blocking doors into the exhaust nozzle.

There is a need to provide for a variable area nozzle of a gas turbine engine that integrates a thrust reverser unit in an effective manner.

According to an aspect of the invention, an exhaust nozzle for a gas turbine engine is provided, wherein the exhaust nozzle comprises a nozzle wall, the nozzle wall comprising an upstream, fixed structure and a downstream, translatable structure that is translatable relative to the fixed structure, a flow channel which is limited radially outwards by the nozzle wall, a centerbody arranged in the flow channel, at least one strut connecting the centerbody to the nozzle wall, a thrust reverser unit that comprises blocking doors, a first actuation system for deployment of the blocking doors into a deployed position for thrust reversal, and a second actuation system for translating the translatable structure between a stowed, upstream position and a fully deployed, downstream position. It is provided that the at least one strut is connected to the fixed structure, that the blocking doors are connected to the translatable structure, and that the first actuation system and the second actuation system are independent actuation systems.

Aspects of the invention are thus based on the idea to provide a nozzle that comprises a nozzle wall with a fixed structure and a translatable structure, wherein the centerbody of the strut arranged in flow channel is connected to the fixed structure and wherein blocking doors of a thrust reverser unit are connected to the translatable structure. The first actuation system for deploying the blocking doors and the second actuation system for displacing the translatable structure are fully independent actuation systems. In particular, actuation of the blocking doors is not automatically triggered by a specific position of the translatable structure of the nozzle wall caused by the second actuation system but is the result of an independent actuation of the first actuation system.

By providing a downstream, translatable structure of the nozzle wall, the location of the minimum cross-sectional area of the nozzle (the nozzle throat area) can be adjusted without the need to adjust the axial position of the centerbody. Accordingly, the centerbody can be fixed to the fixed structure of the nozzle wall in a simple manner without translating features.

According to an embodiment, the nozzle wall comprises cascades which are configured to receive air from the nozzle inside and deflect such air towards the outside front of the nozzle, wherein such cascades are fixed to the fixed structure of the nozzle wall. It may be provided that, when the translatable structure of the nozzle wall is in the upstream position, the cascades are covered by the translatable structure, and that, only when the translatable structure of the nozzle wall is in the most downstream position, the cascades are free to receive and guide air from the nozzle inside. In particular, when the translatable structure of the nozzle wall is in the downstream position, and when the first actuating system has been actuated to deploy the blocking doors, the cascades are free to receive air turned by the deployed blocking doors.

The translatable structure of the nozzle wall may comprise an outer extending wall element and an inner extending wall element, wherein, when the translatable structure is in the upstream position, the outer extending wall element is adjacent the cascades to the outside and the inner extending wall element is adjacent the cascades to the inside. In the upstream position, the cascades are thus confined both radially inside and radially outside by wall elements of the translatable structure.

In particular, the outer extending wall element of the translatable structure in relation with outer elements of the fixed structure creates a blockage of the air flow through the cascades when the translatable structure is in the upstream or a middle position, creating a smooth streamlined annulus for the ambient air flow. The inner extending wall element of the translatable structure in relation with inner elements of the fixed structure creates a blockage of the air flow through the cascades when the translatable structure is in the upstream or a middle position, creating a smooth streamlined annulus for the jet pipe air flow.

In an embodiment, the first actuating system is configured to deploy the blocking doors only when the translatable structure is in the most downstream position. In this respect, it is pointed out that, as the first and second actuation systems are independent, the blocking doors may or may not be deployed when the translatable structure is in the downstream position. In particular, in an idle thrust reduction mode the translatable structure may be moved to the most downstream position without deploying the blocking doors, thereby allowing air to pass through the cascades and reducing the forward thrust.

In an exemplary embodiment, the blocking doors are located at the inside of the translatable structure of the nozzle wall in the non-deployed position, and are pivotable by means of the first actuation system into the deployed position in which they point towards the centerline of the nozzle, wherein the pivot points of the blocking doors are located in the translatable structure. In such case, it may be provided that, when the blocking doors are deployed, the inner ends of the blocking doors lie next to the centerbody and the struts, such that the flow channel is fully closed by the deployed blocking doors and thrust reversal is optimal.

In an embodiment, the thrust reverser unit may comprise more than two blocking doors, such as at least 4 blocking doors, for example between 4 and 20 blocking doors.

An embodiment of the first actuating system comprises a motor, a profiled feed shaft driven by the motor, and a slider element that is both displaceable along the length of the feed shaft and rotatable by rotation of the feed shaft. The slider element is coupled to at least one element that transfer the rotation of the slider element that is caused by a rotation of the feed shaft to at least one blocking door for deployment or retraction of the blocking doors. This embodiment allows to convey a rotational movement from the feed shaft to the blocking doors. As the slider element is displaceable along the length of the feed shaft, it does not pose a problem that the motor of the first actuating system is located in the fixed structure of the nozzle wall or in an adjacent pylon or fuselage. The transmission of a torque to the blocking doors is not hindered when the translatable structure of the nozzle wall is moved into the downstream position. In that case, the slider element simply slides along the feed shaft.

To provide that the slider element is both displaceable along the length of the feed shaft and rotatable by rotation of the feed shaft, the slider element may have the same profile as the profiled feed shaft (with the feed shaft having the male profile and the slider element having the female profile). For example, the profile can be any polygonal profile or a TORX® profile.

In an embodiment, the slider element is coupled to two coupling shafts whose axes are inclined to the feed shaft axis and to each other, wherein each coupling shaft transfers the rotation of the feed shaft to a blocking door. In an embodiment, the slider element has worm (thread) teeth and the adjacent coupling shafts each have angled teeth pinions. Combination of such worm and pinion drive can automatically integrate a reduction function. This enables the feed shaft to rotate with higher speeds than the coupling shafts, transferring a low torque only on the coupling shafts. This allows to reduce the weight of the feed shaft. A higher torque is achieved only in vicinity of where it is required.

The rotational coupling between the slider element and the two coupling shafts can be implemented in a plurality of manners. The slider element comprises a worm screw which interacts with a toothing formed around the circumference of the coupling shafts. Rotation of the slider element thereby is translated into a rotation of the coupling shafts.

In principle, the first actuating system may comprise a plurality of profiled feed shafts, each feed shaft coupled to a slider element and each slide element coupled to two coupling elements for transferring the rotational movement of the feed shaft to two or more blocking doors coupled to the coupling elements. To reduce the number of profiled feed shafts and respective motor units, in an embodiment, it is provided that at least one of the blocking door is coupled to a further blocking door by a joint (such as a universal joint) to transfer a rotation of the feed shaft to the further blocking door. This way, several or all blocking doors can be rotated by one feed shaft into and out of the deployed position and the blocker doors themselves can integrate functionality of additional (flexi) shafts.

In an embodiment, the blocking doors are coupled to each other to form two half-circular arrangements, wherein each such half-circular arrangement of blocking doors is coupled to the slider element that is connected to the driving shaft. In such embodiments, a single feed shaft and associated motor and slider element are required only to implement the first actuation system.

In an embodiment, the translatable structure of the nozzle wall and the fixed structure of the nozzle wall comprise elements which, when the translatable structure is in the upstream position, overlap in the axial, circumferential and/or radial direction. By maximizing the radial, axial and circumferential overlap of the elements of the nozzle, the radial extension of the nozzle wall can be minimized. This allows to attach the gas turbine engine directly or via a very small pylon to the fuselage of the aircraft.

In an embodiment, the first actuation system is realized in an inboard area of the nozzle located adjacent an aircraft fuselage. This allows to place elements of the first actuation system, such as a motor, into the aircraft fuselage or a pylon and, thereby, to reduce the radial dimension of the nozzle wall.

As already mentioned, as the nozzle wall comprises a translatable structure, the centerbody can be attached to the fixed structure of the nozzle wall in a fixed manner. However, it may be provided in alternative embodiments that the centerbody is attached in an axially displaceable manner to the fixed structure of the nozzle wall to provide for additional variation of the cross-sectional area of the nozzle.

In an embodiment, the second actuation system comprises a plurality of actuators, each actuator comprising a shaft or piston that is displaceable in the axial direction to move the translatable structure of the nozzle wall relative to the fixed structure of the nozzle wall. The actuators may be implemented as pneumatic, hydraulic or electric actuators. The actuators can be linear actuators which directly apply a force in the axial direction to the translating structure. The actuators may alternatively be rotational actuators, wherein a rotational motor drives a shaft, such as a flex-shaft, which translates the rotary motion of the motor into a linear movement by means of a gear arrangement. Such gear arrangement may be a worm and rack drive or a rack and pinion drive.

According to an embodiment, the second actuation system is configured to move the translatable structure into the stowed position when the aircraft speed surpasses a defined value. Accordingly, at higher speeds such as during cruise (both subsonic and supersonic), the translatable structure is in the fully stowed position. In the stowed position, the nozzle throat area may be at a minimum.

At lower speeds the translatable structure may be moved in a partially deployed position or in a fully deployed position, without deploying the blocking doors. In such case, the nozzle throat area may be at a maximum. This is done mostly for the noise reduction or idle thrust reduction purposes.

In the deployed position of the blocking doors, the cascades arranged in the fixed structure of the nozzle wall are exposed to the air flow that is initially turned by the blocking doors radially outwards. The cascades then provide for the final turn of the air flow in the desired reverse thrust direction.

In an embodiment, the nozzle comprises exactly two struts. The two struts may be arranged approximately in a plane. Single or multiple struts are possible as well as alternative embodiments.

The exhaust nozzle may be a convergent-divergent nozzle, wherein the cross-section of the nozzle first decreases in the downstream direction towards a nozzle throat area (usually referred to as A8) and subsequently increases until it reaches the nozzle exit area (usually referred to as A9). By translating the displaceable structure of the nozzle wall relative to the centerbody, the degree of expansion of the flow channel behind the nozzle throat area, i.e. the ratio of A9 to A8, can be adjusted.

According to an embodiment, the nozzle is configured as the nozzle of a supersonic gas turbine engine which is designed for operating conditions in the subsonic, transonic and supersonic ranges.

It should be noted that, when referring to a movement in the axial direction, the movement can be both in the axial direction and against the axial direction, i.e., back and forth.

It should further be noted that the present invention is described in terms of a cylindrical coordinate system having the coordinates x, r and φ. Here x indicates the axial direction, r the radial direction and φ the angle in the circumferential direction. The axial direction is defined by the machine axis/engine centerline of the gas turbine engine, with the axial direction pointing from the engine inlet to the engine outlet. The axial direction of the gas turbine engine is at least substantially identical with the axial direction of the exhaust nozzle of the gas turbine engine. Starting from the x-axis, the radial direction points radially outwards.

Terms such as "in front of" and "behind" refer to the axial direction or flow direction in the engine. Terms such as "outer" or "inner" refer to the radial direction.

The invention will be explained in more detail on the basis of exemplary embodiments with reference to the accompanying drawings in which.

Figure 1:
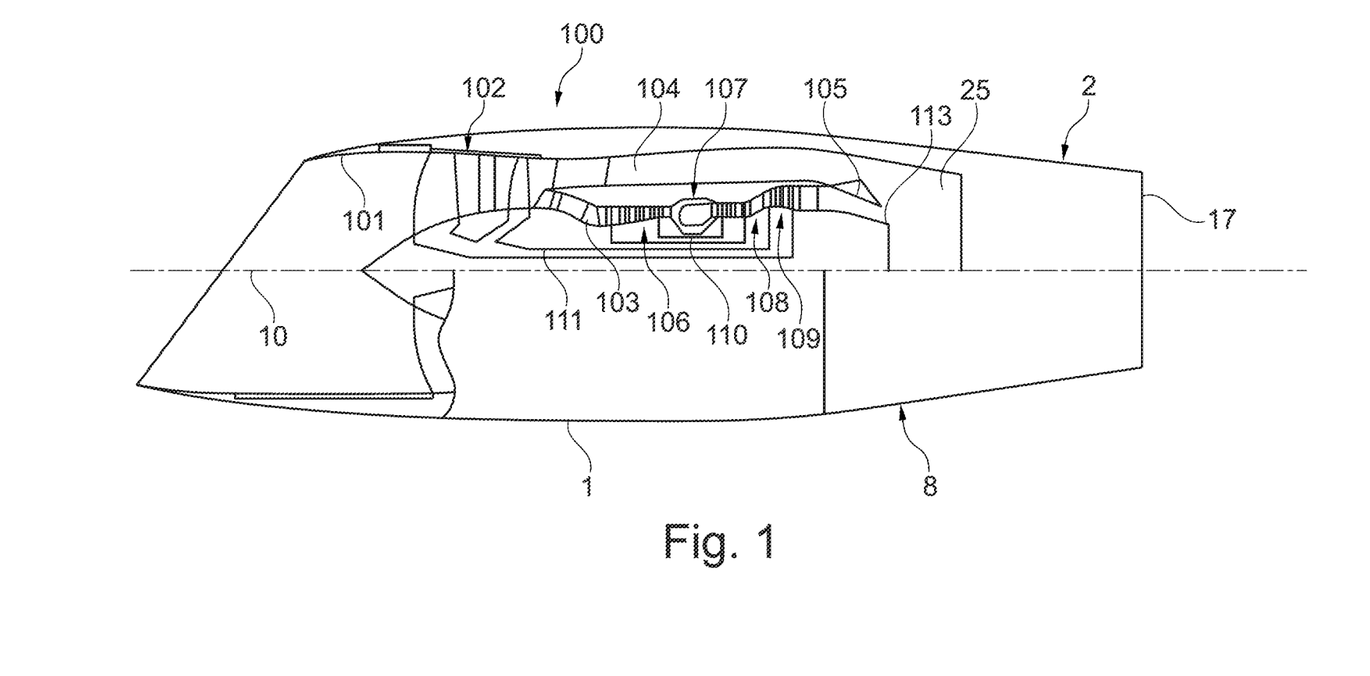
FIG. 1 is a schematic sectional side view of a supersonic gas turbine engine.

FIG. 1 shows a turbofan engine which is intended and suitable for use in a civil or military supersonic aircraft and, accordingly, is designed for operating conditions in the subsonic, transonic and supersonic ranges. However, it should be noted that the principles of this invention can also be implemented in a turbofan engine designed for subsonic operation only. The description of the invention in the context of an engine intended for a supersonic aircraft is therefore only to be understood as an example.

The turbofan engine 100 comprises an engine intake 101, a fan 102 which may be a multi-stage fan, a primary flow channel 103 which passes through a core engine, a secondary flow channel 104 which bypasses the core engine, a mixer 105 and a nozzle 2 in which a thrust reverser 8 can be integrated.

The turbofan engine 100 has a machine axis or engine centerline 10. The machine axis 10 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have a medium-pressure compressor, a medium-pressure turbine and a medium-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 1. The engine nacelle 1 may be connected to the aircraft fuselage via a pylon.

The engine intake 101 forms a supersonic air intake and is, therefore, designed and suitable for decelerating the incoming air to velocities below Ma 1.0 (Ma=Mach number). The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

In the context of this invention, the design of the nozzle 2 is of relevance.

Figure 2:
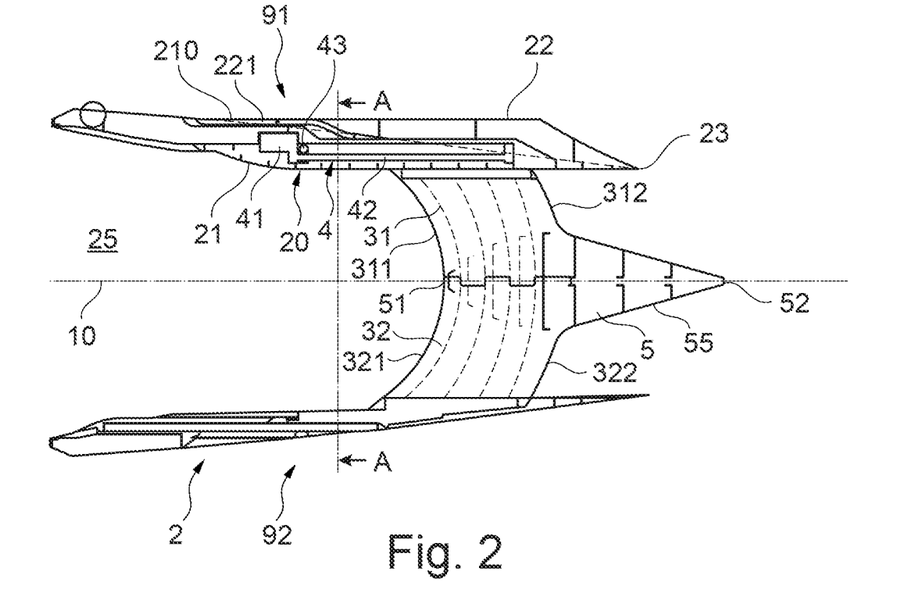
FIG. 2 is a horizontal sectional view of an embodiment of an exhaust nozzle that comprises a nozzle wall with a fixed structure and a translatable structure, wherein the translatable structure is in a stowed, upstream position, wherein a centerbody of the nozzle is attached to the fixed structure by means of struts, and wherein blocking doors of a thrust reverser unit are connected to the translatable structure of the nozzle wall.
Figure 3:
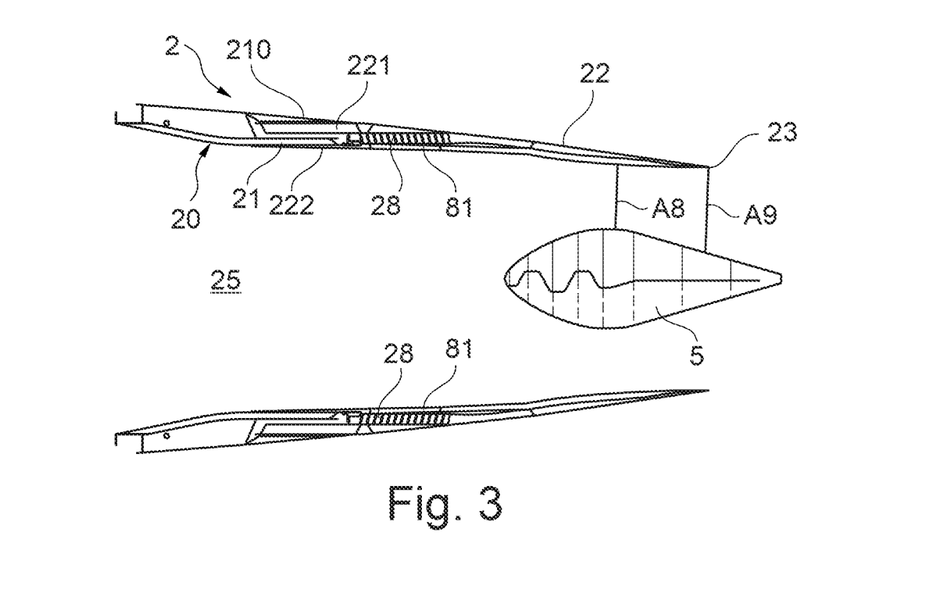
FIG. 3 is the nozzle of FIG. 2 in a vertical sectional view.

FIGS. 2 and 3 show schematically the basic design of the nozzle 2 in sectional views that contain the engine centerline 10, wherein FIG. 2 is a sectional view along the horizontal direction and FIG. 3 is a sectional view along the vertical direction. Accordingly, the two wall sections shown in FIG. 2 correspond to right and left wall sections and the two wall sections shown in FIG. 3 correspond to upper and lower wall sections.

The nozzle 2 comprises an outer nozzle wall 20 which forms the radially outer boundary of a flow channel 25 through the nozzle 2. The nozzle 2 further includes a centerbody 5, which forms a surface 55. The centerbody 5 has a longitudinal axis identical to the engine centerline 10. The centerbody 5 forms an upstream end 51, a downstream end 52 and a maximum of its cross-sectional area between the upstream end 51 and the downstream end 52. In the example shown, but not necessarily, the centerbody 5 is conical adjacent to its downstream end 52.

The nozzle 2 further comprises two struts 31, 32 connecting the centerbody 5 to the nozzle wall 20. They extend from the centerbody 5 in a radial direction through the flow channel 25 to the nozzle wall 20. The struts 31, 32 each have a profile with a front edge 311, 321 and a rear edge 312, 322, as well as an upper side and a lower side. Each strut 31, 32 has a radially outer end at which it is connected to the nozzle wall 20 and a radially inner end at which it is connected to the centerbody 5.

The struts 31, 32 are approximately arranged in a plane containing the engine centerline 10. An arrangement of the struts "approximately" in a plane exists insofar as the struts have a three-dimensional extension corresponding to the profile they form. Furthermore, in embodiments, it may be provided that the two struts 31, 32 are arranged at an angle to each other.

The nozzle wall 20 comprises two structures, an upstream, fixed structure 21 and a downstream, translatable structure 22 which is translatable relative to the fixed structure 21. Both structures comprise wall elements. In FIGS. 2 to 6, the translatable structure 22 is in a stowed, most forward position. The downstream end of the nozzle wall 20 forms a nozzle exit edge 23.

As can be seen in the sectional view of FIG. 3, the nozzle wall 20 further contains cascades 28 which are formed by a plurality of vanes. The cascades serve to turn air that has been deflected and turned by deployed blocking doors further to the forward direction, as will be discussed in more detail with respect to FIGS. 12 to 16. The cascades 28 are fixed to the fixed structure 21 of the nozzle wall 20. To the radial inside of the cascades 28 is an inner extending wall element 222 and to the radial outside of the cascades is an outer extending wall element 221, wherein both extending wall elements 21, 222 extend in the upstream direction, thereby overlapping parts of the fixed structure 21 of the nozzle wall 20 in the axial and circumferential directions.

As can be seen in the sectional view of FIG. 3, the nozzle 2 comprises a thrust reverser unit which is integrated into the nozzle 2 and which comprises blocking doors 81. The blocking doors 81 are connected to the translatable structure 22 of the nozzle wall and are arranged in the innermost layer of the translatable structure 22. To deploy the blocking doors 81 for thrust reversal, and to retract the blocking doors 81 back to the non-deployed position, a first actuation system 4 is provided which comprises a motor 41, a profiled feed shaft 42 driven by the motor and a slider element 43 that is both displaceable along the length of the feed shaft 42 and rotatable by rotation of the feed shaft 42. In FIG. 1, the slider element 43 is in the most upstream position of the feed shaft 42. The construction and function of the feed shaft 42 and slider element 43 will be discussed in more detail with respect to FIGS. 19 to 21.

The first actuation system 4 may be located in an area 91 of the nozzle 2 that is attached to the fuselage of an aircraft, either directly or through a pylon, although this is not necessarily the case. As the area in which the first actuation system is arranged may comprise a larger radial thickness, part of that radial thickness may be hidden in the pylon or fuselage.

There is further provided a second actuation system for translating the translatable structure 22 between the stowed, upstream position shown in FIGS. 2 to 6 and a fully deployed, downstream position shown in FIGS. 12 to 18. The second actuation system comprises a plurality of actuators, which may be electric, pneumatic or hydraulic actuators and which may be linear or rotational actuators. Such actuators are connected to the fixed structure 21 of the nozzle wall or, alternatively, are placed in another fixed structure such as a pylon or a fuselage. In an embodiment, the actuators of the second actuating system each comprise a linearly movable piston, the end of which is connected to the translatable structure 22, such that by linear movement of the piston the translatable structure 22 can be moved relative to the fixed structure 21 in the axial direction. Such pistons are shown as pistons 61 in FIGS. 15 and 16.

The first actuation system and the second actuation system are separate. Thereby, actuation of one system is independent of actuation of the other system in the sense that moving the translatable structure 22 of the nozzle wall between the stowed position and the deployed position is independent of a deployment of the blocking doors 81. In particular, the translatable structure 22 may be moved without deployment of the blocking doors 81.

It can be seen in FIG. 3 that the nozzle 2 forms a nozzle throat area A8 where the cross-sectional area between centerbody 5 and nozzle wall 20 is minimum. Typically, the axial position of the nozzle throat area A8 is defined by the axial position of the maximum 53 of the centerbody 5. However, this is not necessarily the case. At the nozzle exit edge 23, the thrust nozzle forms a nozzle exit area A9. The ratio A9 to A8 defines the degree of expansion of the flow channel 25 behind the nozzle throat area A8.

Figure 4:
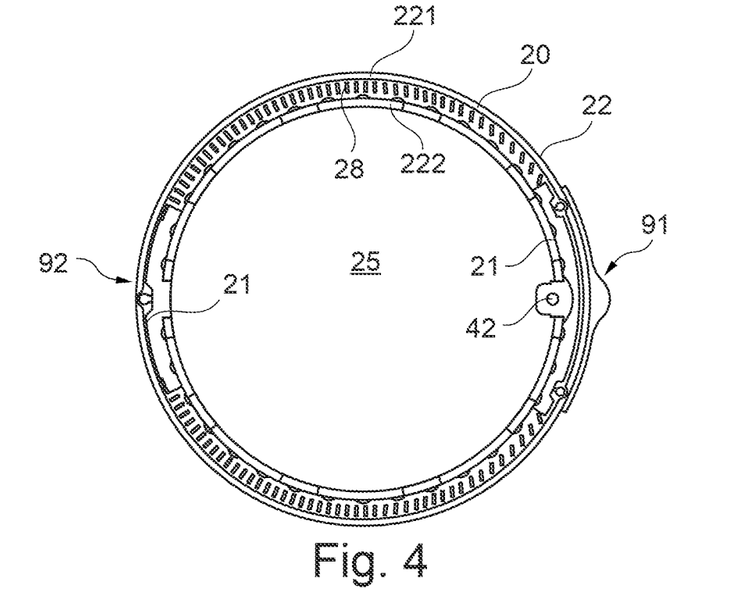
FIG. 4 is the nozzle of FIG. 2 in a cross-sectional view along the lines A-A of FIG. 2.

The cascades 28 are not formed along the complete circumference of the nozzle wall 20, but in upper and lower areas of the nozzle wall 20 only. This can be further seen in the cross-sectional view of FIG. 4 which is taken along the lines A-A of FIG. 2. FIG. 4 also shows that the cascades 28 which are part of the fixed structure 21 are neighbored both to the inside and the outside by the extending wall elements 221, 222 which of part of the translatable structure 22. The area 91 which in embodiments is adjacent the fuselage of the aircraft has a larger radial thickness than the opposite area 92.

Figure 5:
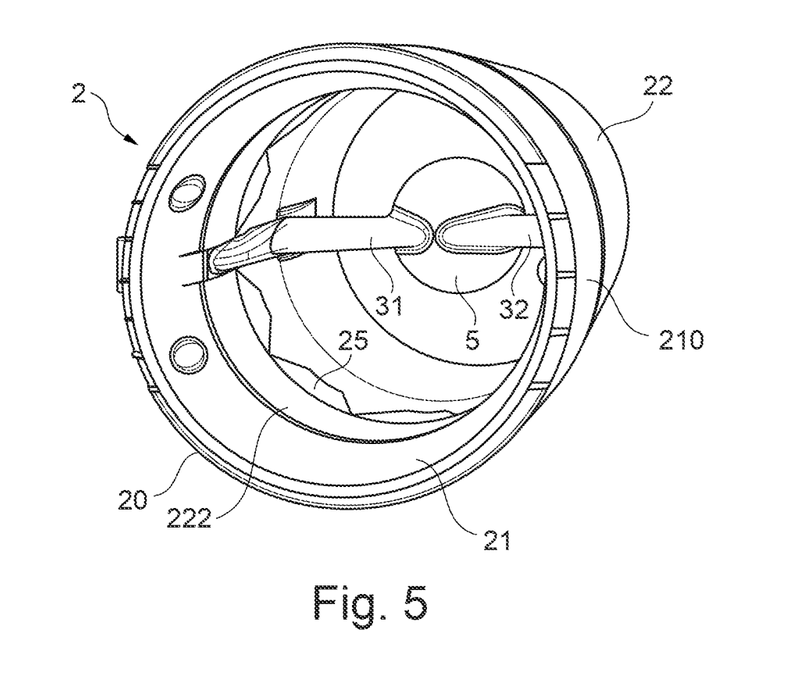
FIG. 5 is a front perspective view of the nozzle of FIG. 2.
Figure 6:
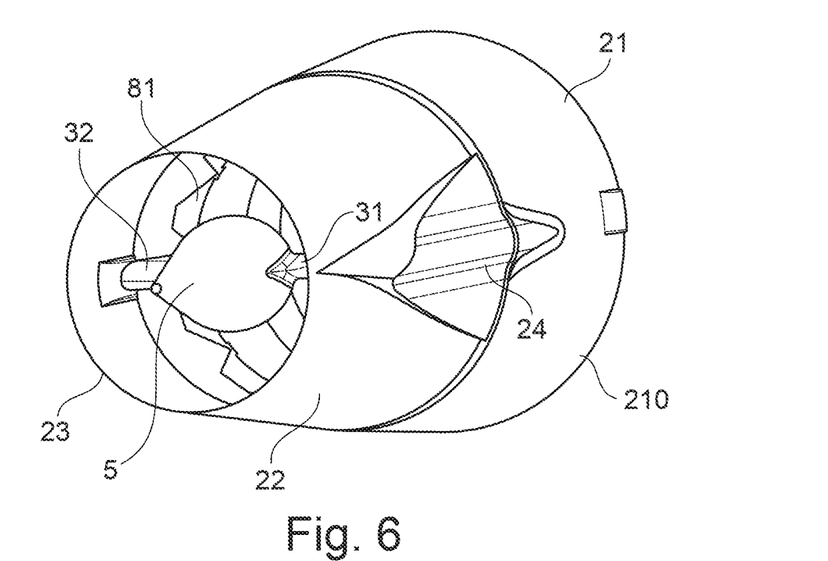
FIG. 6 is a rear perspective view of the nozzle of FIG. 2.

The perspective depictions of the nozzle 2 from the front and from the rear in FIGS. 5 and 6 further shows a guiding structure 24 which serves to guide the translating structure 22 relative to the fixed structure 21. It is pointed out that the outer extending wall element 221 of the translatable structure 22 cannot be seen in FIGS. 5 and 6, it is hidden by the outer wall 210 of the fixed structure 21.

FIGS. 7 to 11 correspond to FIGS. 2 to 6 and show the nozzle 2 in a state in which the translating structure 22 has been moved in the axial direction into a partially deployed position. In this respect, it is pointed out that the translatable structure 22 may take at least one position between the stowed position and the fully deployed position.

Figure 7:
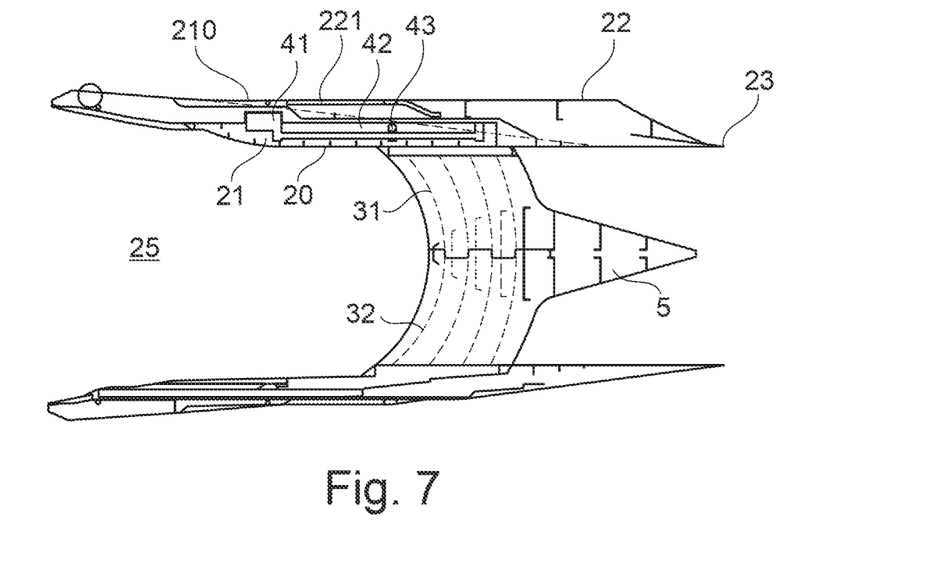
FIG. 7 is a horizontal sectional view of the nozzle of FIG. 2, wherein the translatable structure is in a partially deployed position relative to the fixed structure of the nozzle wall.
Figure 8:
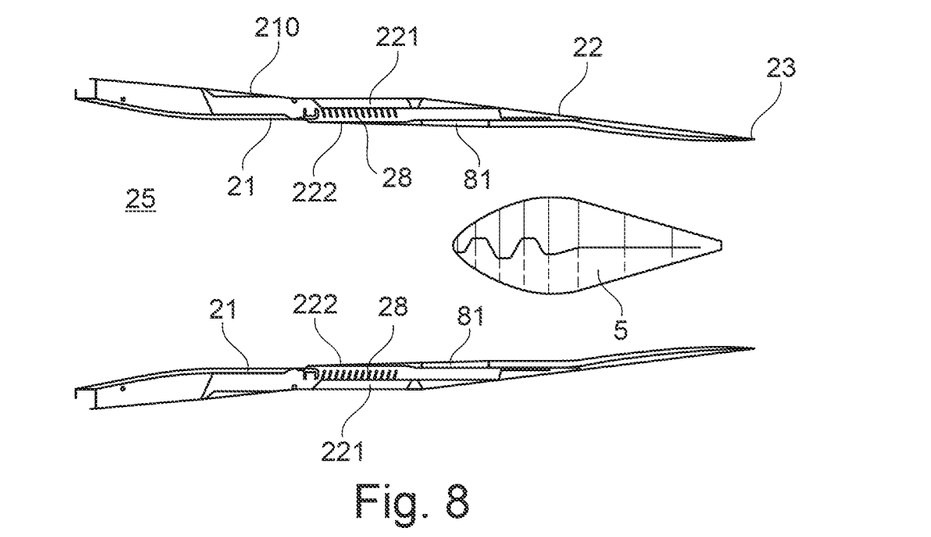
FIG. 8 is the nozzle of FIG. 7 in a vertical sectional view.
Figure 9:
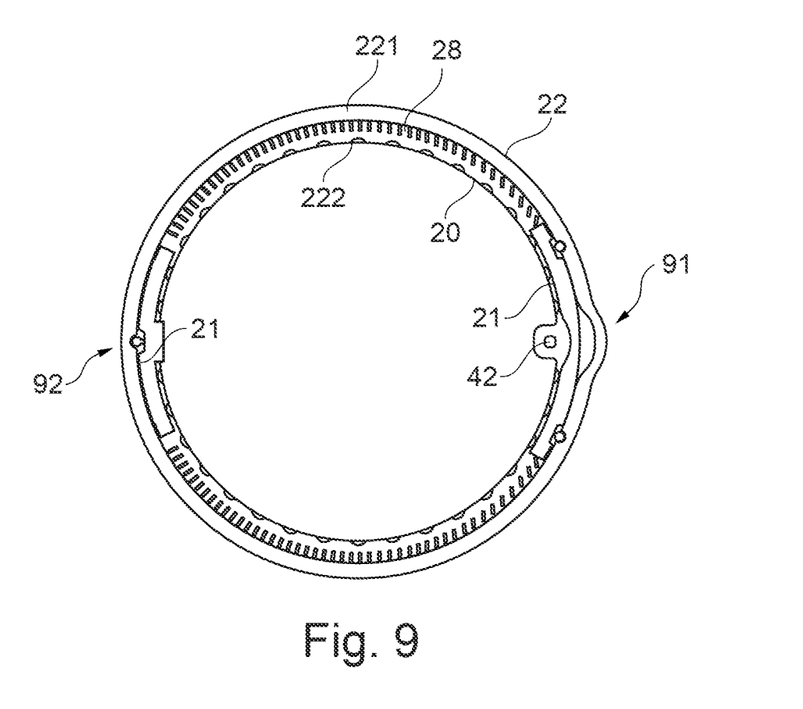
FIG. 9 is the nozzle of FIG. 7 in a cross-sectional view.

In the position shown in FIGS. 7 to 11, the outer extending wall element 221 and the inner extending wall element 222 have been moved in the rearward direction, but still lie next to the cascades 28, as is shown in particular in FIGS. 8 and 9. Accordingly, the cascades 28 are still closed. The blocking doors 81 which are connected to the innermost side of the translatable structure 22 have also been moved in the rearward direction. They are still in the non-deployed position.

Figure 10:
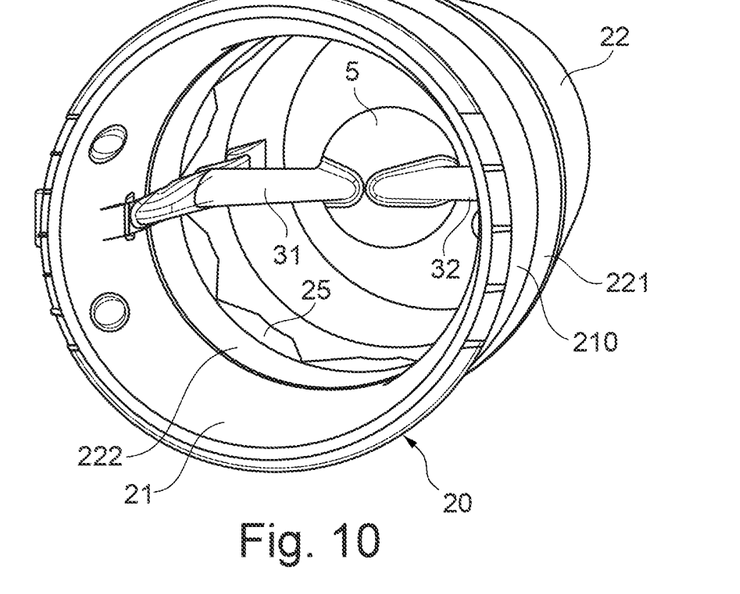
FIG. 10 is a front perspective view of the nozzle of FIG. 7.
Figure 11:
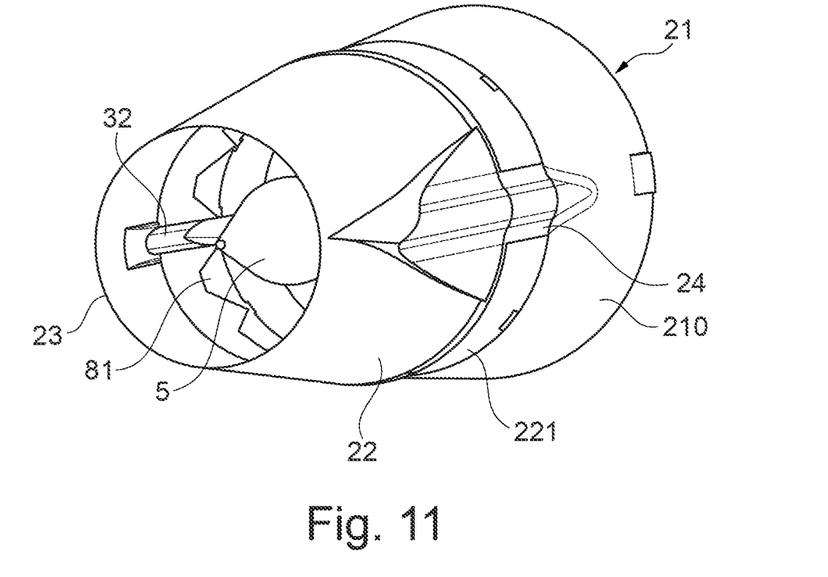
FIG. 11 is a rear perspective view of the nozzle of FIG. 7.
Figure 12:
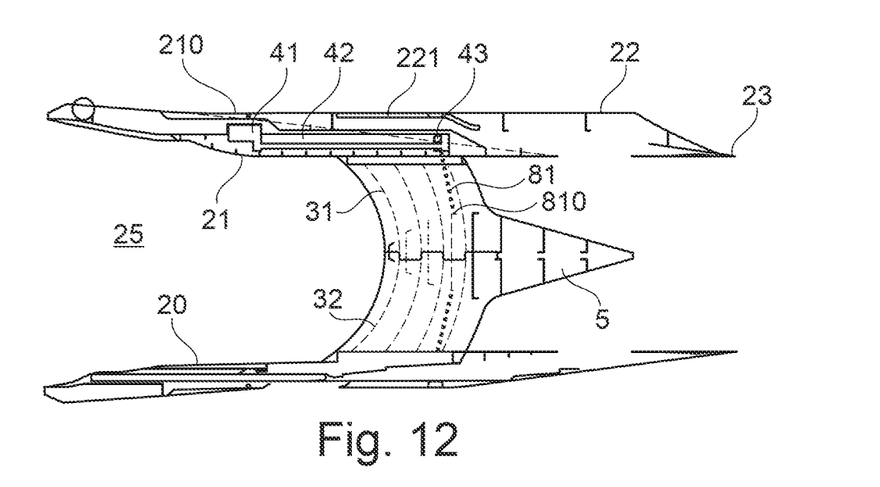
FIG. 12 is a horizontal sectional view of the nozzle of FIG. 2, wherein the translatable structure is in a fully deployed position relative to the fixed structure of the nozzle wall, and wherein the blocking doors are in the deployed state.
Figure 13:
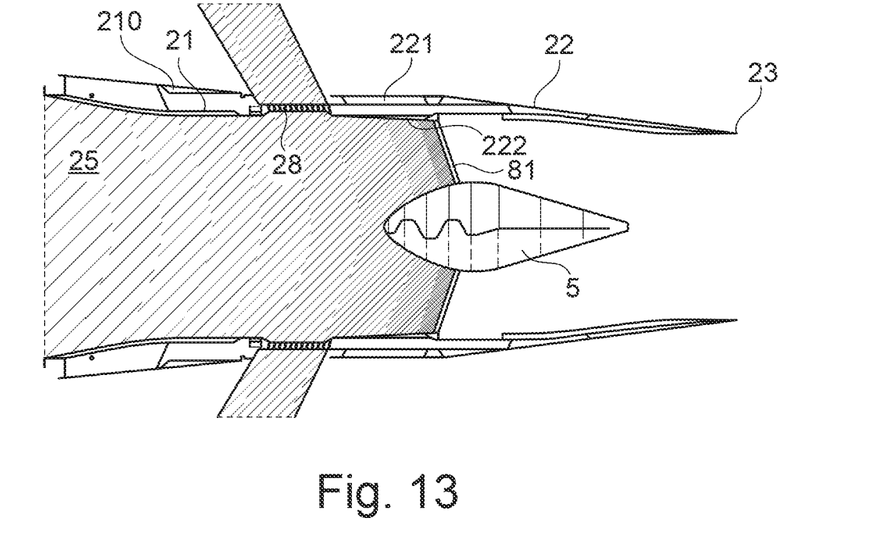
FIG. 13 is the nozzle of FIG. 12 in a vertical sectional view.
Figure 14:
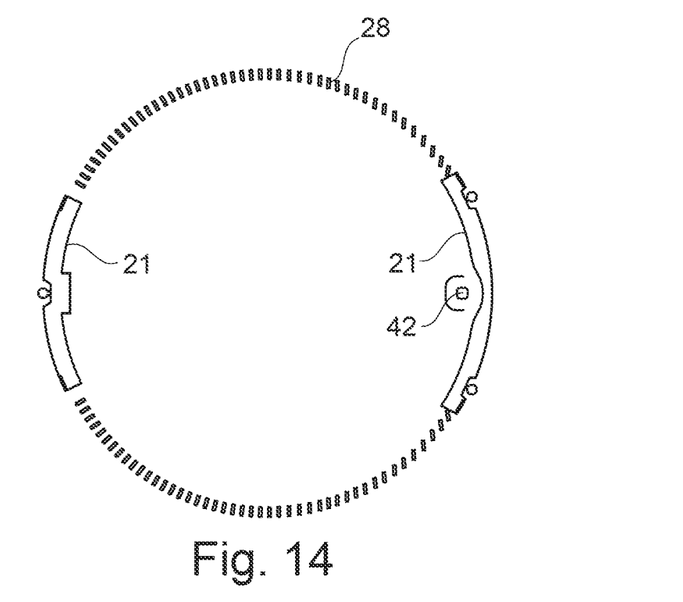
FIG. 14 is the nozzle of FIG. 12 in a cross-sectional view.

According to FIGS. 10 and 11, the outer extending wall element 22 is no longer hidden by the outer wall 210 of the fixed structure 21 but now forms the outer envelope of the nozzle in the area radially outward of the cascades.

The slider element 43 is in a middle position of the feed shaft 42 in FIG. 7 as the slider element 43 is coupled to the blocking doors 81 such that, when the blocking doors 81 are displaced in the axial direction by axial displacement of the translatable structure 22, the slider element 43 slides along the feed shaft 42.

FIGS. 12 to 16 correspond to FIGS. 2 to 6 and show the nozzle 2 in a state in which the translating structure 22 has been moved in the axial direction into the fully deployed position in which the blocking doors 81 have been actuated. The slider element 43 is now in the most downstream position at the feed shaft 43 and has been actuated to rotate the blocking doors 81 into the deployed position, as will be explained with respect to FIGS. 19 to 21.

The blocking doors 81 point into the flow channel 25, with their radial inner ends 810 resting at the centerbody 5 such that the flow channel 25 is fully blocked. Accordingly, the airstream is turned and directed towards the cascades 28 which are now free, i.e., not anymore covered by the inner and outer extending wall elements 22, 21. This is shown in particular in FIGS. 13 and 14.

Figure 15:
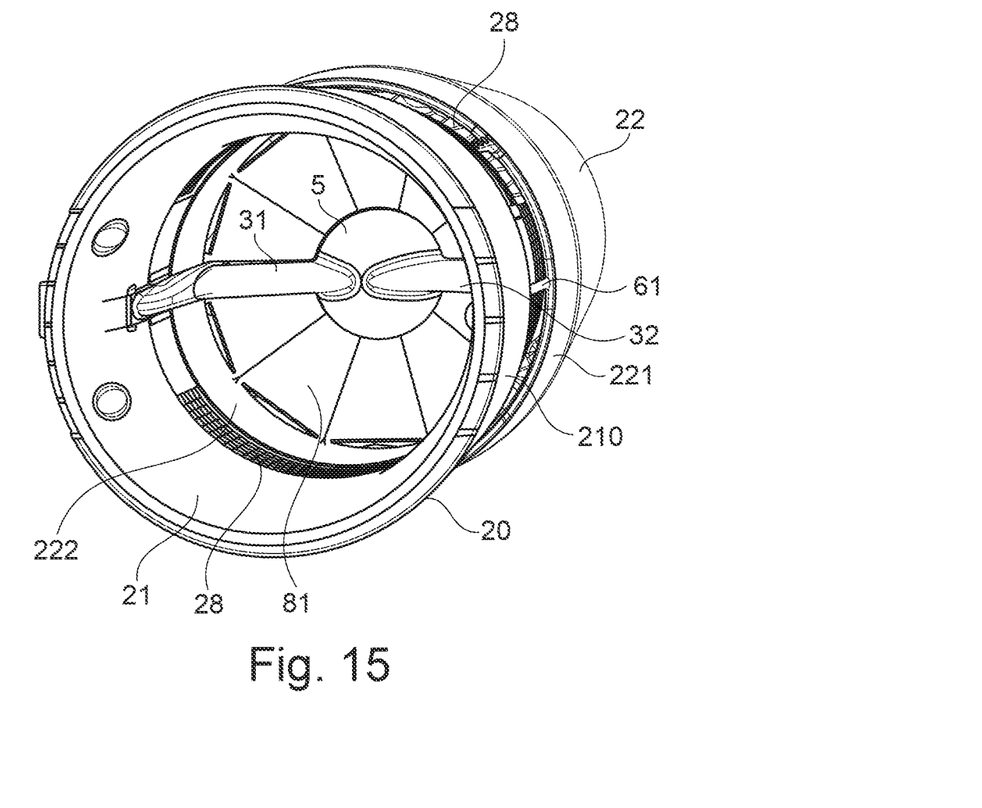
FIG. 15 is a front perspective view of the nozzle of FIG. 12.
Figure 16:
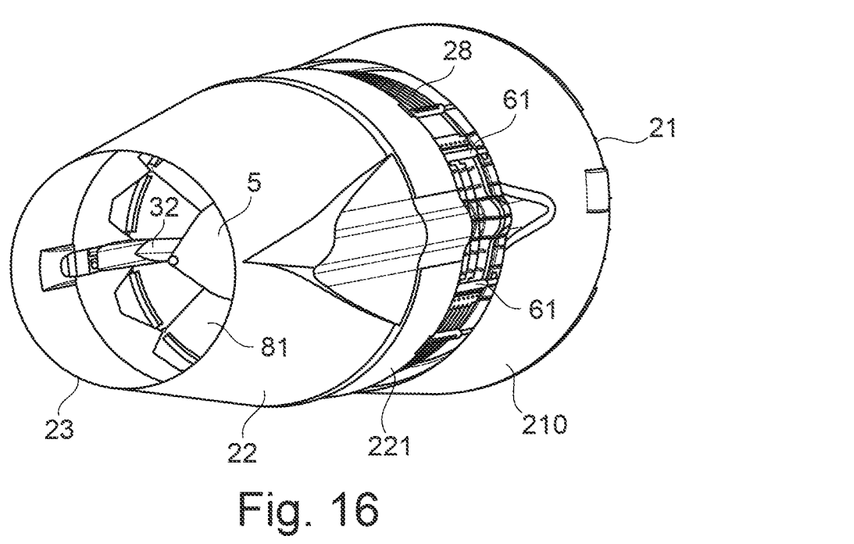
FIG. 16 is a rear perspective view of the nozzle of FIG. 12.

FIGS. 15 and 16 show both the cascades 28 and the deployed blocking doors 81. The inner and outer extending wall elements 22, 21 have been moved even further downstream.

Figure 17:
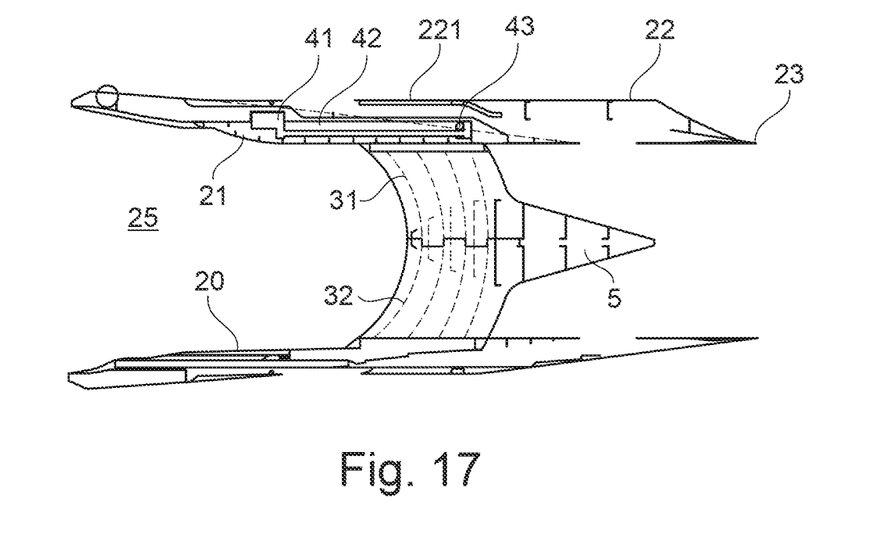
FIG. 17 is a horizontal sectional view of the nozzle of FIG. 2, wherein the translatable structure is in a fully deployed position relative to the fixed structure of the nozzle wall, and wherein the blocking doors are not in the deployed state.
Figure 18:
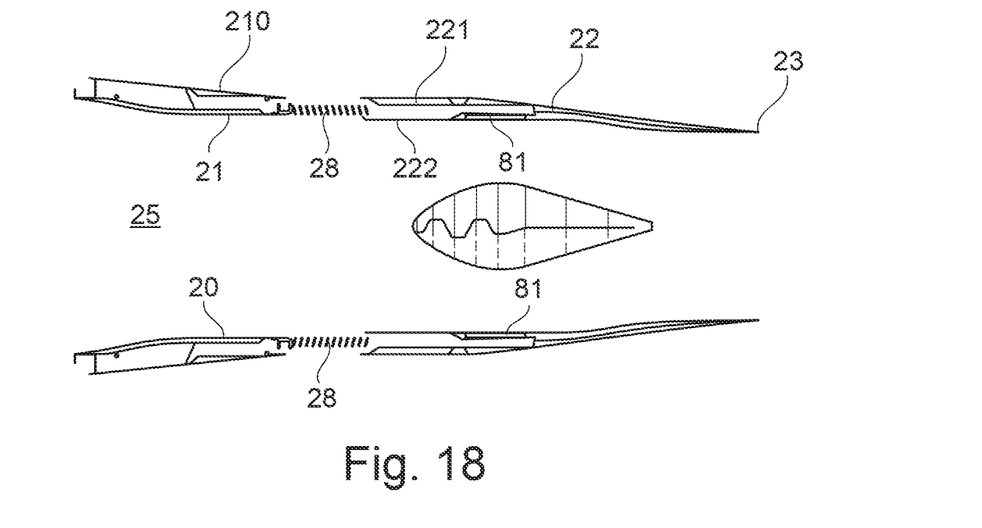
FIG. 18 is the nozzle of FIG. 17 in a vertical sectional view.

FIGS. 17 and 18 show an embodiment in which the translatable structure 21 is in the fully deployed position, similar as in FIGS. 12 to 16. However, the blocking doors 81 have not been actuated. This is possible as the first actuation system for actuating the blocking doors 81 is separate from the second actuation system for translating the translatable structure 21 between the stowed and the deployed positions.

The configuration of FIGS. 17 and 18 may be used at idle thrust.

The axial distance that the translatable structure 22 is displaceable relative to the fixed structure 21 may lie in the range between 500 mm and 1500 mm, in particular in the range between 800 mm and 1200 mm.

Figure 19:
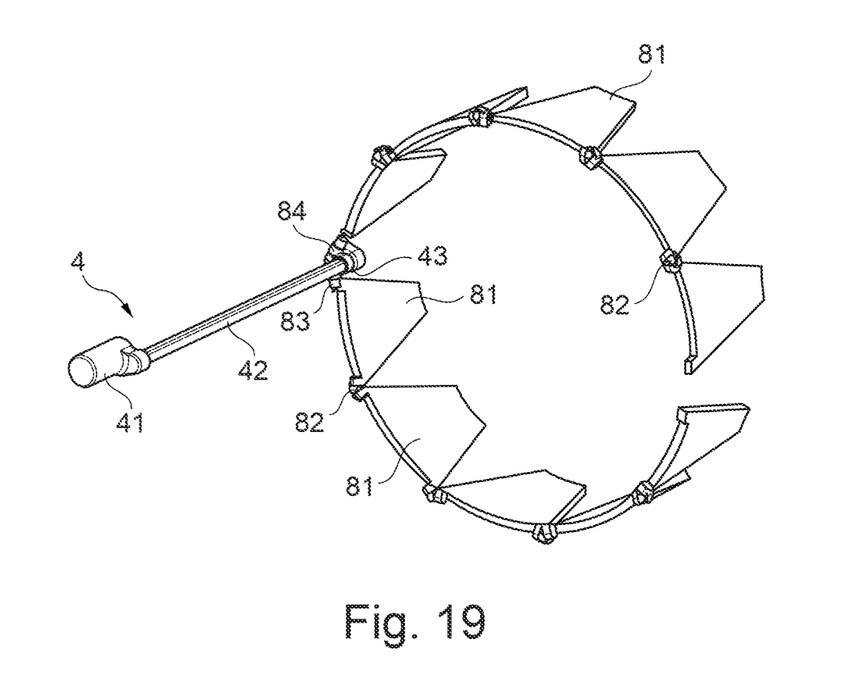
FIG. 19 is a perspective view of an actuating system for deploying a plurality of blocking doors, wherein the actuating system comprises a profiled feed shaft and a slider element that is displaceable along the feed shaft and rotatable by rotation of the feed shaft, wherein the blocking doors are in the retracted position.
Figure 20:
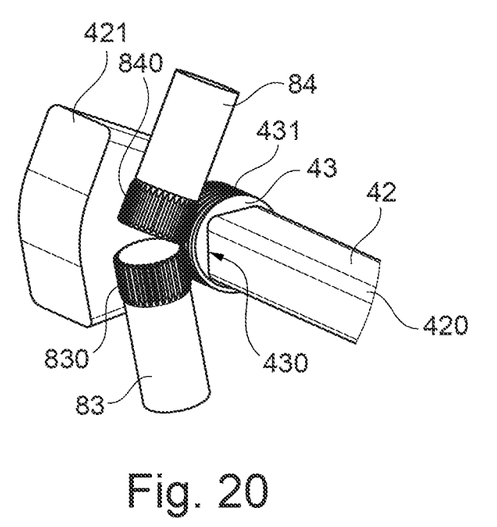
FIG. 20 an enlarged perspective view of the slider element of FIG. 19.
Figure 21:
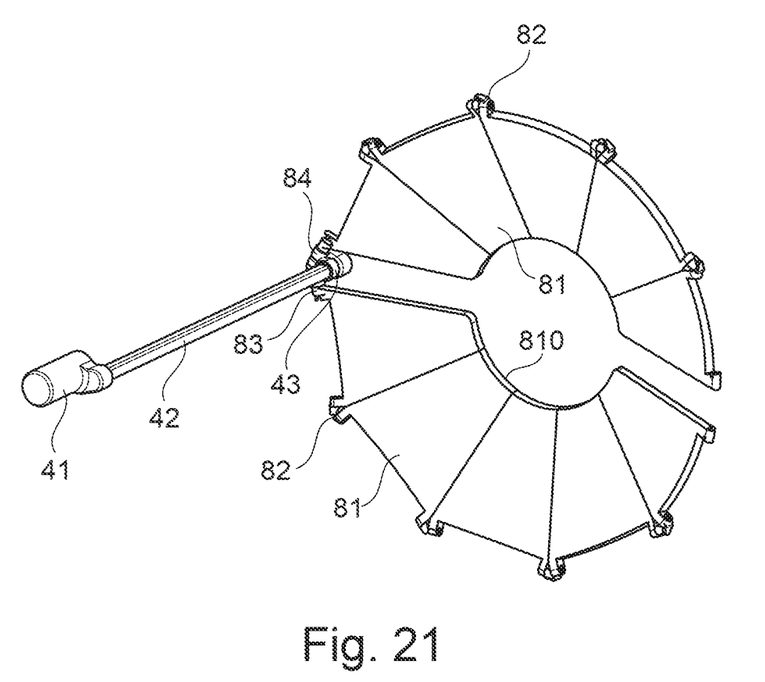
FIG. 21 the actuating system of FIG. 19, wherein the blocking doors are in the deployed position.

FIGS. 19 to 21 show in more detail the first actuation system 4. As already mentioned, the first actuation system 4 comprises a motor 41, a profiled feed shaft 42 and a slider element 43. The slider element 43 is shown in the most downstream position at the feed shaft 43, wherein a stop element 421 is provided to stop the slider element 43 at the end of the feed shaft 42.

As can be seen in particular in FIG. 20, the profile 430 of the slider element 43 is identical to the profile 420 of the feed shaft 42 (female and male profile). This allows the slider element 43 to slide along the longitudinal length of the feed shaft 42. It further enables the feed shaft 42 to rotate the slider element 43 by rotation of the feed shaft 42. Rotation of the feed shaft is effected by the motor 41. The profile 420 may be a polygonal profile or a TORX® profile.

The slider element 43 is coupled to two coupling shafts 83, 84, wherein the coupling shafts 83, 84 comprise axes which are inclined to the axis of the feed shaft 42. To transfer the rotational movement of the slider element 43 to the coupling shafts 83, 84, the slider element comprises a thread 431 which forms a warm screw which interacts with toothings 830, 840 formed around the circumference of the coupling shafts 83, 84.

The coupling between the slider element 43 and the two coupling shafts 83, 84 can integrate a reduction function such that the coupling shafts 83, 84 rotate slower than the feed shaft 42. Accordingly, the feed shaft 42 transfers a low torque only on the coupling shafts 83, 84 which allows to reduce the weight of the feed shaft 42.

As can be seen in FIGS. 19 and 21, the coupling shafts 83, 84 are each connected to a blocking door 81, such that rotation of the feed shaft 42 translates into a rotation of blocking doors 81.

Further, the blocking doors 81 are connected to each other by further joints 82 that transmit the rotary motion of one blocking door onto the next blocking door. The further joints 82 may be formed as universal joints. This way, the rotary motion of the coupling shaft 83 is transferred to a plurality of blocking doors 81 and the rotary motion of the other coupling shaft 84 is also transferred to a plurality of a blocking doors 81. In particular, the blocking doors 81 coupled to the coupling shaft 83 form a half-circular arrangement and the blocking doors coupled to the coupling shaft 84 form a half circular arrangement such that, by a single motor 41, feed shaft 42 and slider element 43 all blocking doors 81 it can be rotated and deployed.

In alternative embodiments, more than one feed shaft 42 and slider element 43 may be provided, with the same principle as in FIGS. 19 and 21, but with less blocking doors 81 coupled to one feed shaft 42.

In further embodiments, there are provided more than two struts, such as three, four or five struts, to connect the centerbody 5 to the nozzle wall 20. In a further embodiment, there is just a single strut that connects the centerbody 5 to the nozzle wall 20.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An exhaust nozzle of a gas turbine engine, wherein the exhaust nozzle comprises:
 a nozzle wall, the nozzle wall comprising an upstream, fixed structure and a downstream, translatable structure that is translatable relative to the fixed structure,
 a flow channel which is limited radially outwards by the nozzle wall,
 a centerbody arranged in the flow channel,
 at least one strut connecting the centerbody to the nozzle wall,
 a thrust reverser unit that comprises blocking doors,
 a first actuation system for deployment of the blocking doors into a deployed position for thrust reversal, and a second actuation system for translating the translatable structure between a stowed, upstream position and a fully deployed, downstream position,
wherein the at least one strut is connected to the fixed structure,
wherein the blocking doors are connected to the translatable structure, and
wherein the first actuation system and the second actuation system are independent actuation systems;
wherein the first actuation system comprises a motor, a profiled feed shaft driven by the motor, and a slider element that is both axially displaceable along a length of the profiled feed shaft and rotatable by rotation of the profiled feed shaft, and wherein the slider element is coupled to at least one element that transfers the rotation of the slider element to at least one of the blocking doors.

2. The exhaust nozzle of claim 1, wherein the nozzle wall comprises cascades which are configured to receive air from an interior of the nozzle and deflect the air towards an exterior front of the nozzle, wherein the cascades are fixed to the fixed structure of the nozzle wall.

3. The exhaust nozzle of claim 2, wherein, when the translatable structure of the nozzle wall is in the upstream position, the cascades are covered by the translatable structure, and when the translatable structure of the nozzle wall is in the downstream position, the cascades are free to receive the air from the interior of the nozzle.

4. The exhaust nozzle of claim 3, wherein the translatable structure of the nozzle wall comprises an outer extending wall element and an inner extending wall element, wherein, when the translatable structure is in the upstream position, the outer extending wall element is adjacent to the cascades to the exterior and the inner extending wall element is adjacent to the cascades to the interior.

5. The exhaust nozzle of claim 3, wherein, when the translatable structure of the nozzle wall is in the downstream position, and when the first actuation system has been actuated to deploy the blocking doors, the cascades are free to receive the air turned by the deployed blocking doors.

6. The exhaust nozzle of claim 1, wherein the first actuation system is configured to deploy the blocking doors only when the translatable structure is in the downstream position.

7. The exhaust nozzle of claim 1, wherein the blocking doors are located at the interior of the translatable structure of the nozzle wall in the non-deployed position, and are pivotable by the first actuation system into the deployed position in which the blocking doors point towards a centerline of the nozzle, wherein pivot points of the blocking doors are located in the translatable structure.

8. The exhaust nozzle of claim 7, wherein, when the blocking doors are deployed, inner ends of the blocking doors lie next to the centerbody.

9. The exhaust nozzle of claim 1, wherein the slider element has a same interior profile as the profiled feed shaft to cause the slider element to be both axially displaceable along the length of the profiled feed shaft and rotatable by the rotation of the profiled feed shaft.

10. The exhaust nozzle of claim 1, wherein the slider element is coupled to two coupling shafts whose axes are inclined to an axis of the profiled feed shaft and to each other, wherein each coupling shaft transfers the rotation of the profiled feed shaft to the at least one of the blocking doors.

11. The exhaust nozzle of claim 10, wherein the slider element comprises a worm screw which interacts with a toothing formed around a circumference of the coupling shafts.

12. The exhaust nozzle of claim 10, wherein the coupling between the slider element and the two coupling shafts integrates a reduction function such that the coupling shafts rotate slower than the profiled feed shaft.

13. The exhaust nozzle of claim 10, wherein the blocking doors of the thrust reverser unit comprises more than two blocking doors, where the at least one of the blocking doors is coupled to a further one of the blocking doors by a joint to transfer the rotation of the profiled feed shaft to the further one of the blocking doors.

14. The exhaust nozzle of claim 13, wherein the blocking doors are coupled to each other to form two half-circular arrangements, wherein each of the two half-circular arrangements of the blocking doors is coupled to the slider element.

15. The exhaust nozzle of claim 1, wherein the translatable structure of the nozzle wall and the fixed structure of the nozzle wall comprise elements which, when the translatable structure is in the upstream position, overlap in an axial, circumferential and/or radial direction.

16. The exhaust nozzle of claim 1, wherein the first actuation system is positioned in an inboard area of the nozzle.

17. The exhaust nozzle of claim 1, wherein the at least one strut that connects the centerbody to the nozzle wall is connected in a fixed manner to the fixed structure of the nozzle wall.

18. The exhaust nozzle of claim 1, wherein the second actuation system comprises a plurality of actuators, each actuator comprising a shaft or piston that is axially displaceable to move the translatable structure of the nozzle wall relative to the fixed structure of the nozzle wall.

19. The exhaust nozzle of claim 1, wherein the second actuation system is configured to move the translatable structure into the stowed position when the aircraft speed surpasses a defined value.

20. The exhaust nozzle of claim 1, wherein the slider element rotates with the profiled feed shaft as the slider element axially displaces along the profiled feed shaft.

* * * * *